United States Patent [19]

Runge

[11] 3,776,073
[45] Dec. 4, 1973

[54] METHOD AND APPARATUS FOR PREPARING CHEESE CUTS

[75] Inventor: Heinz Runge, Niles, Ill.

[73] Assignee: Kraftco Corporation, New York, N.Y.

[22] Filed: Oct. 30, 1970

[21] Appl. No.: 85,459

[52] U.S. Cl............... 83/47, 83/208, 83/212.1, 83/238, 83/241, 83/278, 83/522
[51] Int. Cl............................ B26d 5/24, B26d 7/28
[58] Field of Search................... 146/72, 73, 78 R, 146/99, 119, 241; 83/47, 238, 241, 522, 369; 226/9, 123 X; 83/278, 71, 208, 155

[56] References Cited
UNITED STATES PATENTS

| | | | |
|---|---|---|---|
| 3,433,278 | 3/1969 | Comstock | 146/78 R |
| 3,552,462 | 1/1971 | Comstock | 146/78 R |
| 3,142,323 | 7/1964 | Metzler | 146/241 |
| 3,510,944 | 5/1970 | Johnski | 146/78 R |
| 2,700,821 | 2/1955 | Aberlin | 146/72 X |
| 2,711,020 | 6/1955 | Hastings | 146/72 X |
| 2,791,223 | 5/1957 | Molins | 146/119 X |
| 3,379,234 | 4/1968 | Kasper | 146/222 |
| 3,593,370 | 7/1971 | Lapeyre | 146/241 X |
| 2,857,966 | 10/1958 | Sarka | 83/155 X |
| 3,406,601 | 10/1968 | Clifford | 83/208 X |

Primary Examiner—Andrew R. Juhasz
Attorney—Anderson, Luedeka, Fitch, Even and Tabin

[57] ABSTRACT

A method and apparatus for preparing cuts from a food product such as cheese is provided. The method includes advancing a block of cheese upon a support and sensing the advancement of the block. A succession of signals are generated upon sensing the advancement and these signals are counted. The counts are accumulated by a counter until preselected values are reached. The counter initiates a timed sequence each time a desired accumulated preselected value is reached. The timed sequence stops the advancement of the cheese block and initiates a cutting device which divides the cheese into a cut of cheese. The counter may be set to accumulate unequal values so that cuts of cheese are prepared of unequal size.

9 Claims, 6 Drawing Figures

PATENTED DEC 4 1973            3,776,073

INVENTOR
*Heinz Runge*

Anderson, Luedeka, Fitch, Even & Tabin
ATTYS.

FIG.6

METHOD AND APPARATUS FOR PREPARING CHEESE CUTS

The present invention relates generally to cutters for cheese and other food products and, more particularly, the present invention relates to a method and apparatus for automatically preparing various sizes of cuts from an homogeneous food product, such as cheese, according to a predetermined size distribution pattern.

In the retail distribution of many types of food products, it is desirable to prepare cuts of various sizes so that a selection is available to the consumer. Studies have indicated that when cuts are available throughout a range of size and price, sales greatly increase over the marketing of the product in packages of equal size cuts. This is particularly true in the retail distribution of cheese, although the method and apparatus of the invention can also be used for cutting butter, candy, vegetables, sausages and other food products.

Traditionally, cheese has been cut for the retail trade from large blocks, typically about 40 lb., by manually manipulating a large knife while estimating the amount to be cut and pressing the knife downwardly until the piece is severed from the block. It is also known to use a chesse cutting device which comprises a frame and a cutting mechanism. The block of cheese is placed on the frame and advanced by hand or mechanical means a predetermined distance whereupon the knife mechanism is manually lowered so as to divide the block into random or equal size cuts of cheese. Both of these traditional methods are slow and inaccurate and do not prepare cheese cuts according to a predetermined distribution plan.

Accordingly, a principal object of the present invention is to provide an improved method and apparatus for preparing cuts from an homogeneous food product.

Another object of the invention is to provide an apparatus for preparing cheese cuts of unequal size from a block of cheese according to a predetermined distribution pattern.

A further object of the invention is to provide a cheese cutting apparatus wherein the cuts are rapidly and accurately formed from an elongated large block of cheese and placed in a convenient position for packaging.

A still further object of the present invention is to provide unequal cuts of cheese which when aggregated provide a given predetermined weight.

These and other objects and advantages of the invention will become apparent with reference to the following detailed description and accompanying drawing, in which:

Figure 2:
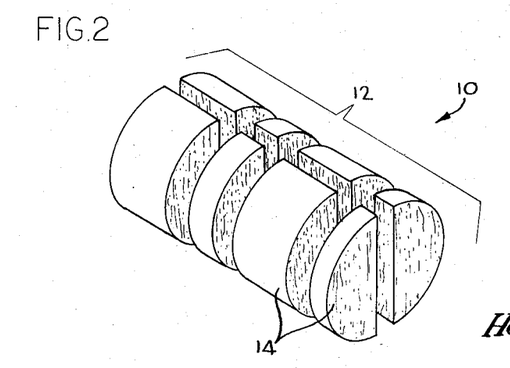
FIG. 2 is a perspective view of a block of cheese which has been formed into cuts of unequal size.

Generally, and with reference to the drawing, there is shown a block of cheese 10 of generally elongated shape and weighing approximately 40 pounds. Such a block of cheese 10 is preferably an economically formed by the method disclosed in Runge et al. U.S. Letters Patent No. 3,562,910, issued Feb. 16, 1971, for "Method and Apparatus for Making Cheese." Blocks of cheese 10 produced by that method are in generally cylindrical form and are adapted to be cut in accordance with the present method. The block of cheese 10 may be divided first by the apparatus into a pair of semi-cylindrical, elongated half-blocks 12 and then further divided into a plurality of cheese cuts 14, each cut preferably being of unequal size and shaped such that it has a semicircular cross-section, as shown in FIG. 2. The apparatus is capable of providing multiple cuts 14 of unequal size, which when aggregated provide desired lot sizes. By way of example, each cut 14 is between about 9 and 15 ounces in size and a plurality of such cuts are packed in 10 pound boxes for commercial distribution.

Figure 1:
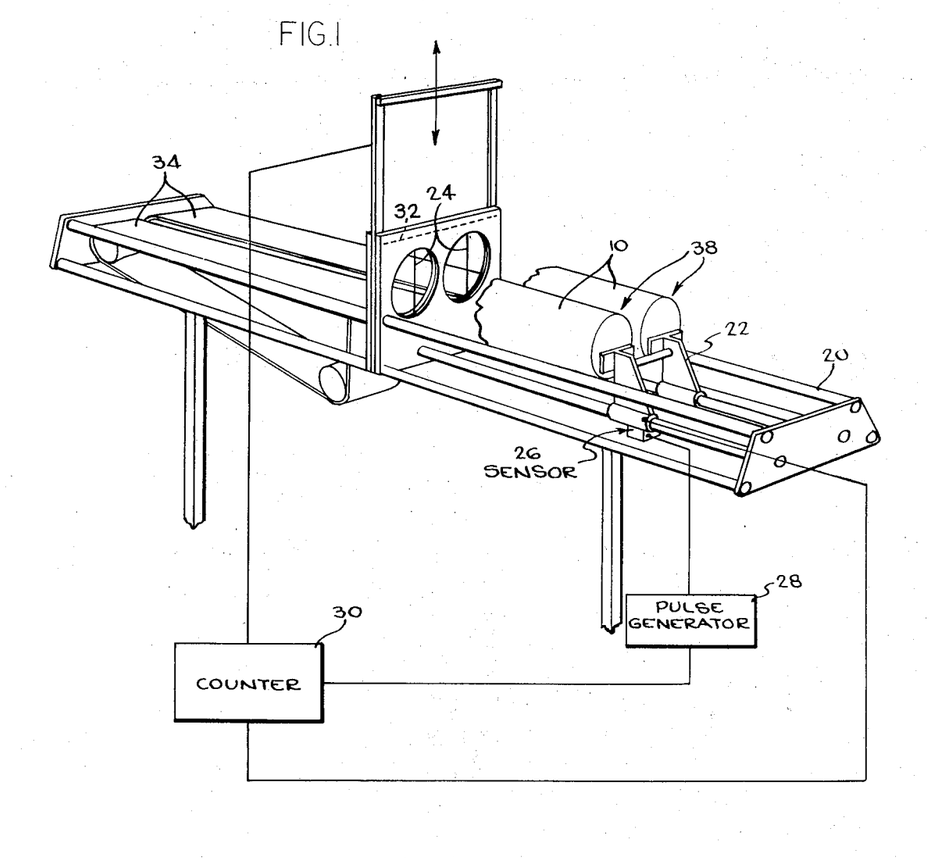
FIG. 1 is a schematic representation of apparatus for preparing cuts from a food product, such as cheese.

Referring now to FIG. 1 of the drawing, there is illustrated schematically apparatus for preparing cuts 14 from a food product such as cheese. In general, the block of cheese 10 is disposed upon a supporting frame 20 and a carriage 22 engages the block of cheese 10 at the rear end thereof for advancing the block longitudinally upon the frame 20. A first cutter or divider 24 is preferably mounted upon the frame 20 in a plane transverse to the longitudinal dimension of the block and is positioned such that as the block advances upon the frame, it is divided longitudinally into a pair of the semi-cylindrical half-blocks 12. As the block 10 advances upon the frame 20, the advancement thereof is determined by a sensor 26. In response to a determination of advancement of the block 10, a pulse generator 28 produces a succession of electrical signals. These signals are received by a counter 30 which is preset to predetermined values, these values preferably being unequal so that a plurality of cheese cuts 14 of unequal size according to a predetermined distribution pattern are prepared from the block of cheese 10. The counts are accumulated by the counter 30 and on each occasion that one of the preselected values is reached, the counter triggers a timed sequence which stops advancement of the carriage 22. Upon cessation of movement, a second cutter or divider 32 mounted for movement in a plane transverse to the longitudinal dimension of the block is actuated to divide the semi-cylindrical half-blocks of cheese 12 accurately into the cuts of cheese 14 of so-called "half moon" shape. A conveyor 34 removes the prepared cheese cuts 14 at a rate relatively greater than the rate of advancement of the block upon the frame 20 so that the cuts are slightly separated for ease of packing.

Although the invention is described in terms of an apparatus for dividing a single block of cheese 10 into accurately formed cuts 14, it should be noted that a pair of blocks 10 are preferably disposed in side by side relation upon the support frame 20 and divided into cuts of cheese simultaneously. As shown in the drawings, the preferred form of the apparatus employs dual units for advancing, cutting and conveying the block of cheese. It should be realized, however, that a plurality of such blocks may be cut by a respective plurality of units adapted for contemporaneous action.

Figure 3:
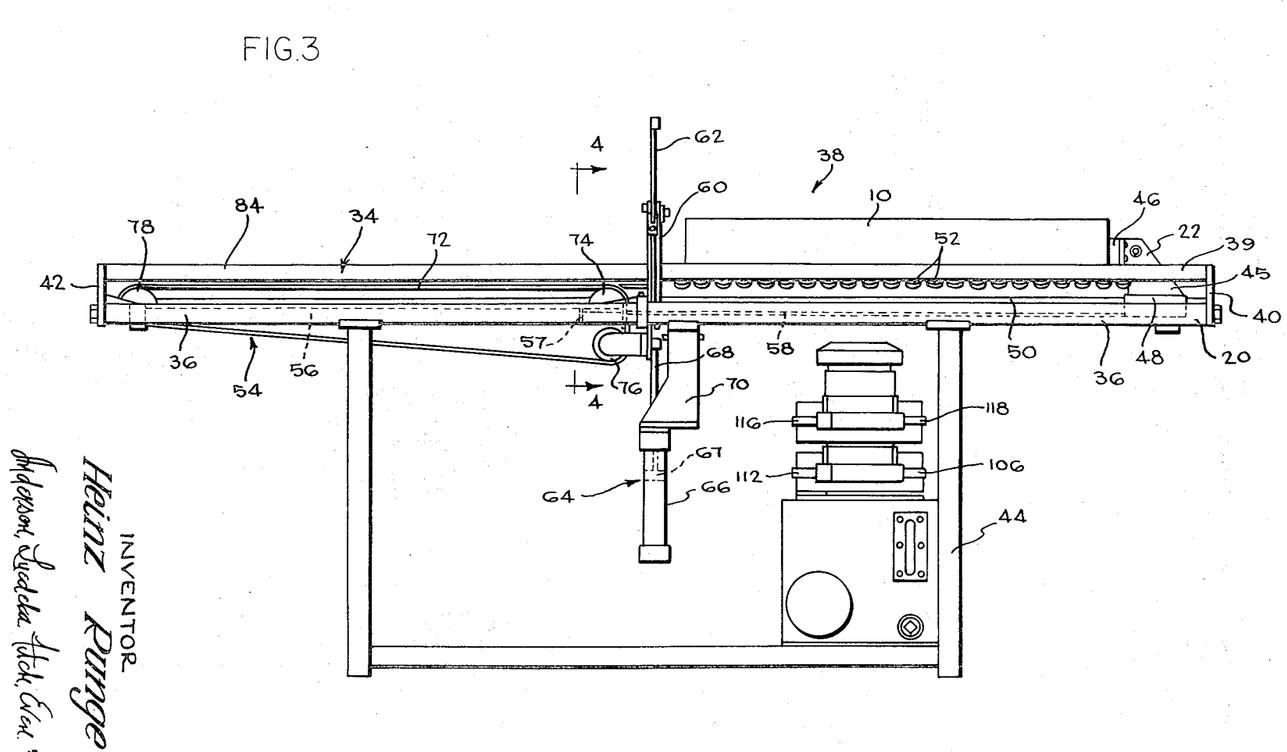
FIG. 3 is a side elevational view of representative apparatus for preparing cheese cuts.
Figure 4:
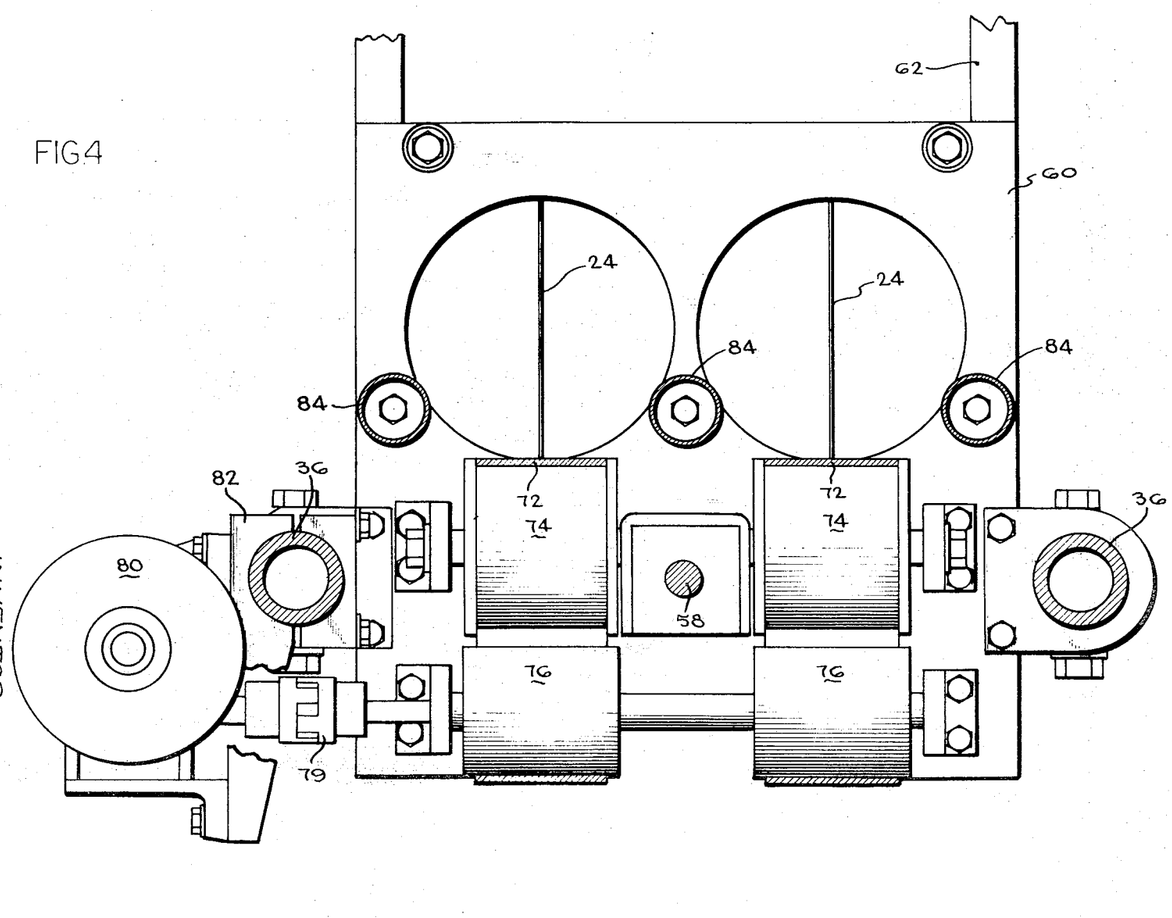
FIG. 4 is a cross-sectional elevational view taken along the line 4—4 in FIG. 3.

More particularly, there is illustrated in FIGS. 3 and 4 of the drawing the apparatus for preparing cuts of cheese 14 in accordance with the method of the present invention. There it can be seen that the supporting frame 20 comprises a pair of elongated support rods 36, one on each side of the frame 20, which define therebetween a cheese receiving area 38. The frame 20 is preferably divided longitudinally by channels 39 into a pair of cheese receiving areas 38 (FIG. 1) in which a pair of blocks of cheese 10 are disposed for cutting. The support rods 36 are connected at their ends to front and rear end plates 40 and 42, respectively, which provide a rigid structure. The support rods 36 rest upon a plurality of legs defining a base 44 for supporting the structure at a height above the floor suitable for convenient and efficient use by the operator of the apparatus.

The carriage 22 for advancing the block of cheese 10 upon the frame 20 includes a yoke 45 having a contact block 46 at the upper end thereof which is adapted to engage the rear end of the block. In the preferred form of the apparatus wherein two blocks of cheese are cut at one time, a pair of contact blocks 46 are provided. At the lower end of the carriage 22 is a bushing 48 for receiving a guide rod 50 extending longitudinally of the frame 20 and adapted to position the carriage 22 so that the block of cheese is accurately guided toward the cutters. A plurality of rollers 52 are journalled in the channels 39 and spaced along the cheese receiving area 38 so that the block of cheese is readily advanced by the carriage 22 toward the cutters while it rests upon the rollers 52. If two blocks of cheese are to be divided, two sets of rollers 52 are provided.

To advance the carriage 22 and hence the block of cheese 10 upon the frame toward the cutters 24 and 32, hydraulic motor means 54 are preferably employed. The motor means 54 generally comprises an hydraulic drive cylinder 56 extending longitudinally of the frame 20 at the rear end thereof, a piston 57 therein, and a piston rod 58 extending outwardly from the piston 57. One end of the cylinder 56 is connected to the end plate 42 and the outer end of the piston rod 58 is connected to the carriage 22 such that upon advancement or retraction of the piston rod vis-a-vis the drive cylinder, the carriage 22 is respectively retracted from or advanced toward the cutters. To move the carriage 22 entirely through the cheese receiving area 38, the drive cylinder 56 typically has a 2 in. bore and a 44 in. stroke. Hence, a block of cheese 10 nearly 44 in. in length can be cut or divided by use of the present apparatus. Of course, cylinders of other lengths may be employed to accommodate blocks of cheese of corresponding lengths. The hydraulic motor means 54 is operated by suitable hydraulic and electrical controls shown in FIGS. 5 and 6 and explained in detail below. Although an hydraulic drive is the presently preferred system, other drive means might also be utilized.

The divider or cutter 24 is mounted in a cutter plate 60 secured to the support rods 36 and the channels 39 of the frame and is disposed adjacent the front end of the block of cheese 10 when it is located in the cheese receiving area 38. The cutter 24 is adapted to divide the block of cheese into the pair of semi-cylindrical half-blocks 12 upon advancement of the block. The cutter 24, which is desirably 0.047 in. diameter music wire for accurate cutting of the block, is rigidly secured within the cutter plate 60 and extends in a vertical direction. When two blocks of cheese 10 are to be divided, a pair of cutters 24 are respectively provided. The cutter 24 need not be employed when it is desired to prepare round cuts of cheese instead of the semi-cylindrical cuts 14 presently preferred.

Mounted for vertical movement within the cutter plate 60 is a cutter fork 62. The cutter fork 62 comprises a rectangular frame having as its lower side the cutter 32. The cutter 32, which is also desirably 0.047 in. diameter music wire, extends transversely to the cutter 24 and to the longitudinal dimension of the block of cheese 10. Hence, the cutters 24 and 32 define a plane. The cutter 32 is of sufficient length to divide a single block of cheese or a pair of such blocks disposed in side by side relation. The block is divided into the cheese cuts 14 upon vertical movement of the cutter 32. It should be noted that either upward or downward movement of the cutter 32 transverse to the longitudinal dimension of the block will divide the block of cheese.

Vertical movement of the cutter 32 is preferably caused by hydraulic motor means 64, which generally comprises an hydraulic cutter cylinder 66 mounted beneath and in the plane of the cutter plate 60 and the cutter fork 62, a piston 67 therein, and a piston rod 68 extending outwardly from the piston 67 and secured to the cutter fork 62. The cylinder 66 is mounted by a suitable mounting bracket 70 to the support rods 36 of the frame. Preferably, the cutter cylinder 66 has about a 1-½ in. bore and an 8 in. stroke, the 8 in. stroke being sufficient to move the cutter 32 so as to entirely divide the block of cheese, the diameter of which is less than the length of the stroke. Of course, if a larger block of cheese is desired to be divided, a cylinder having a larger stroke is preferably employed. Advancement or retraction of the piston rod 68 relative to the cutter cylinder 66 causes the rise or fall, respectively, of the cutter fork 62 and the cutter 32 thereof, thereby dividing the block of cheese into the cheese cuts 14. The hydraulic motor means 64 is operated by suitable hydraulic and electrical control circuits shown in FIGS. 5 and 6 and described in detail below. Although an hydraulically operated cutter is the presently preferred method, other motor means might also be employed.

As the carriage 22 advances the block of cheese 10 upon the rollers 52 of the supporting frame 20, the movement thereof is determined by the sensor 26, the sensing of the movement providing a succession of signals. The sensor 26 may be of any suitable type for determining movement and typically comprises an elongated rack (not shown) mounted to the bottom of the carriage 22 and engageable with a toothed wheel (not shown) associated with the supporting frame 20. Movement of the rack contemporaneously rotates the wheel and thereby indicates movement of the block of cheese. The rotational movement of the wheel is preferably translated into a succession of electrical signals, although other forms of signals might also be used. It should be noted, however, that any suitable sensing means can be employed for determining movement of the carriage 22 and the block of cheese 10 associated therewith.

The rotatable wheel is operatively connected to the pulse generator 28 such that a succession of electrical signals are generated upon rotation of the wheel. The pulse generator 28 is of any suitable type for generating electrical signals at a rate of about 360 pulses per revolution of the rotatable wheel. The presently preferred sensor 26 and pulse generator 28 are made by the Veeder-Root Company. In the presently preferred form of the apparatus, 0.003 inches of lineal movement of the carriage 22 is equivalent to one pulse generated by the pulse generator 28.

The counter 30 receives the electrical signals from the pulse generator 28 and counts the signals. The counter is preset to a plurality of preselected programmed values corresponding to the sizes of the cheese cuts 14 to be formed. The counts are accumulated and when each preselected value is reached, a timed control sequence is triggered which stops advancement of the carriage 22 so that the block of cheese can be divided into the cheese cuts. To this end, the hydraulic motor means 54 and 64 are controlled by the timed sequence triggered by the counter so that advancement of the block is terminated and the cutter 32 is appropriately raised or lowered to divide the block of cheese. The counter 30 typically can be provided with five or six preselected values which are manually preset therein. These values are accumulative, e.g., 131, 245, 350, 470 and 600. When the end of the counted series is reached, the counter automatically switches back to the zero value and begins recounting. The spacing between the values as accumulated determines the length of the block of cheese advanced before movement thereof is terminated and hence the size of the cheese cuts 14. The preselected values are preferably unequal so that a plurality of cheese cuts 14 of unequal size are prepared according to a programmed distribution pattern. When a plurality of cuts of unequal size are aggregated, a given predetermined weight of cheese is provided.

The presently preferred counter 30 for use in the system is a "Digi-Master" counter made by the Veeder-Root Company. Such a counter can be operated at a speed of up to 50,000 counts per second and automatically recycles at speeds of up to 10,000 counts per second without loss of counts, which is adequate for the present purposes. In the use of such a counter 30, if a first cut of cheese 14 one-inch thick, for example, is to be prepared, the counter is set at number 131. If a second cut is to be ⅞-inch thick, for example, the counter is set at number 245, a difference in accumulated value of 114 from the first cut. The system is designed to make approximately 40 cuts per minute. If this speed is exceeded, it is possible that sequencing and accuracy in forming the cuts will be impaired.

To remove the cheese cuts 14 after they have been formed by the cutters 24 and 32 in a direction axially away from the cutters, the conveyor 34 is provided. The conveyor 34, which may be of any suitable type, is set to move at a speed relatively greater than the advancement of the block 10 on the supporting frame 20. This enables the cuts 14 to be slightly separated as they are carried away so that the operator can readily grasp the cuts for placement into packages. The conveyor 34 preferably comprises a conveyor belt 72 mounted for longitudinal movement relative to the supporting frame 20 and trained about a first conveyor pulley 74 located immediately adjacent the cutters 24 and 32 and journalled on a shaft mounted to the cutter plate 60, a drive pulley 76 located beneath the first conveyor pulley 74 and journalled on a shaft mounted to the cutter plate 60, and a second conveyor pulley 78 journalled on a shaft mounted to the end plate 42 near the packaging station. The drive pulley 76 is driven via a coupling 79 by a conveyor drive motor 80 connected by a motor mount 82 to the cutter plate 60. The motor 80 is a DC motor, preferably of the type known as a Boston Ratiotrol motor, and is rated at about 1/6 horsepower and 2.5 amps. If a pair of cheese blocks have been divided, a pair of similar conveyors 34 are provided which are driven by the same motor 80. Guide tubes 84 extend on either side of each conveyor spaced from the upper surface of the belt 72 to maintain the cheese cuts upon the belt.

Figure 5:
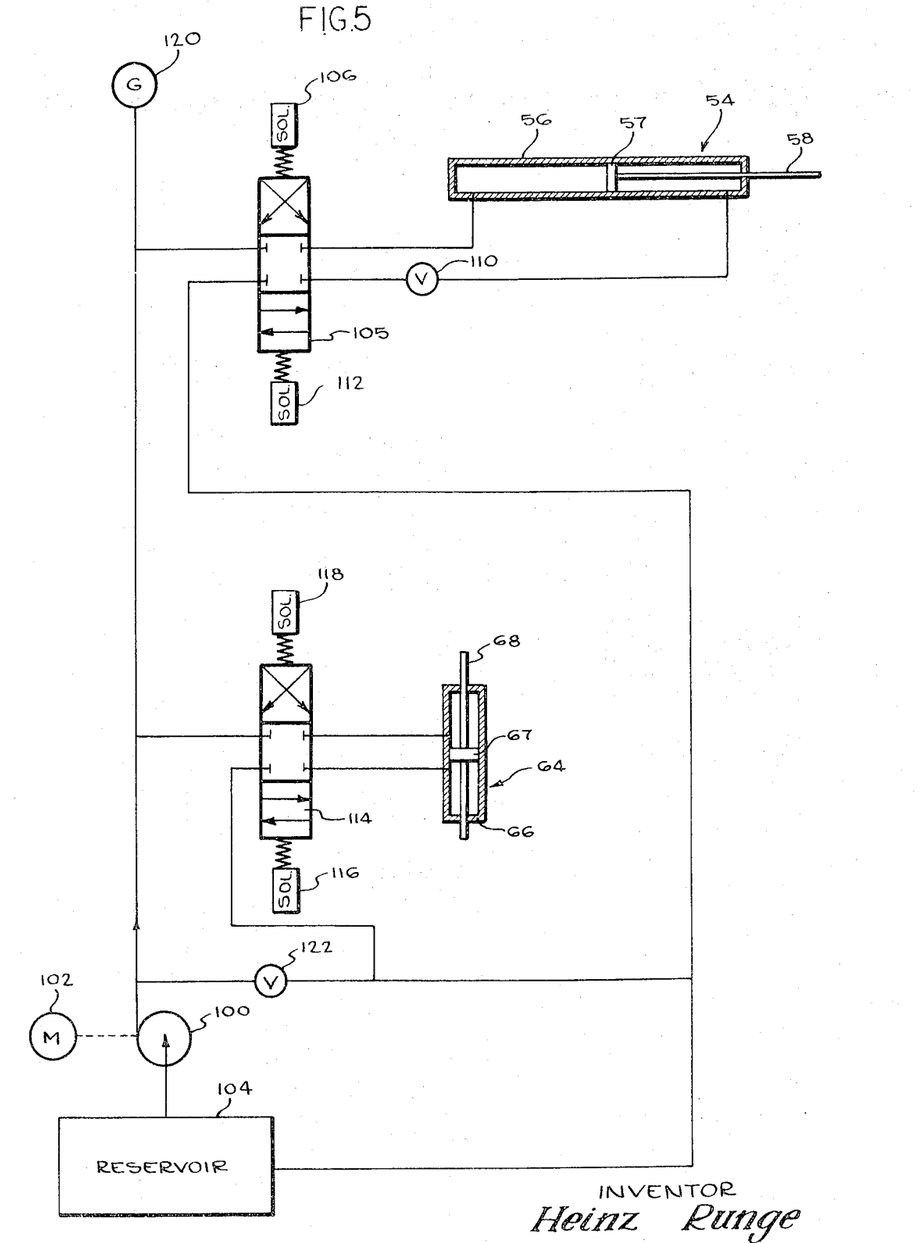
FIG. 5 is a simplified schematic representation of an hydraulic system useful in the present apparatus.

In FIG. 5 of the drawing, there can be seen the hydraulic system for controlling the operation of the carriage 22 which advances the block of cheese 10 and for raising or lowering the cutter 32 which divides the block into cuts of cheese 14. As illustrated, a pump 100 operated by a suitable hydraulic pump motor 102 draws hydraulic fluid from a reservoir or sump 104. The pump 100 is desirably of the fixed displacement type and the motor 102 is preferably rated at about 5 horsepower. The pump 100 distributes hydraulic fluid to operate the motor means 54 and 64. To this end, the fluid is initially pumped through a four-way valve 105 into the motor means 54 which controls advancement of the carriage. A first solenoid 106 controls the four-way valve 105 and when the apparatus of the invention is initially turned on, the hydraulic fluid distributed by the pump 100 passes through the valve 105 held in an open position by the solenoid 106 into the drive cylinder 56 of the hydraulic motor means 54. The fluid flowing into the drive cylinder 56 forces the piston 57 having the piston rod 58 connected thereto to retract. As the piston rod 58 retracts relative to the cylinder 56, the carriage 22 advances upon the supporting frame 20. Hydraulic fluid displaced from the cylinder 56 by the retracting piston 57 is returned through the four-way valve 105 to the reservoir 104. A pressure and temperature compensated flow control valve 110 is in series with the valve 105 and the motor means 54 to provide speed control over movement of the piston rod 58.

When it is desired to retract the carriage 22 on the frame 20 after the block of cheese has been fully divided, a second solenoid 112 is energized to move the four-way valve 105 into a position such that the hydraulic fluid advances the piston 57 within the cylinder 56. The advancing piston rod 58 thereby retracts the carriage 22. Hydraulic fluid displaced from the cylinder 56 is returned to the reservoir 104.

Another four-way valve 114 is in parallel with the four-way valve 105. This four-way valve 114 is normally in a neutral position and controls hydraulic fluid entering into the hydraulic motor means 64 which raises or lowers the cutter fork 62 and the cutter 32 attached thereto to divide the block of cheese 10 into the cheese cuts 14. A third solenoid 116 controls the operation of the four-way valve 114 and when the solenoid 116 is energized, the hydraulic fluid distributed by the pump 100 enters the cutter cylinder 66 of the motor means 64 to force the piston 67 to move downwardly therein. The piston rod 68 connected thereto also moves downwardly, thereby causing the cutter fork 62 to fall and the cutter 32 to divide the cheese. Similarly, a fourth solenoid 18 controls the four-way valve 114 and when it is energized, the piston 67 and the piston rod 68 connected thereto are caused to rise relative to the motor means 64. The cutter fork 62 and the cutter 32 are thereby caused to rise and the cheese block is again divided into cheese cuts 14. Displaced hydraulic fluid is returned to the reservoir 104.

A pressure gage 120 is in parallel with the four-way valves 105 and 114 to determine the pressure of the hydraulic fluid passing therethrough. A pressure release valve 122 is in parallel with both the four-way valves 105 and 114 and is responsive to the pressure gage 120 to prevent the fluid pressure from exceeding 200 psi and for dumping pumped hydraulic fluid when the ports of the four-way valves are both blocked.

Figure 6:
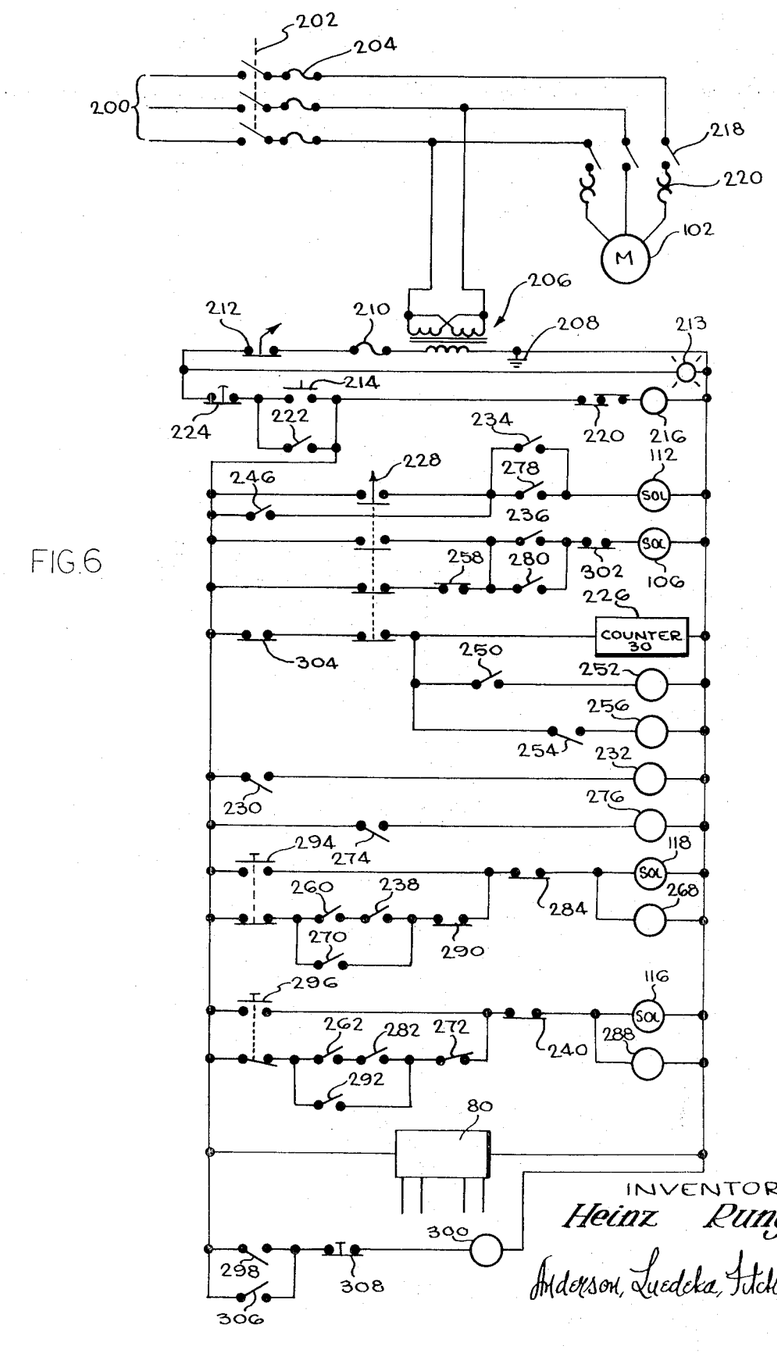
FIG. 6 is a schematic representation of an electrical system used for controlling the apparatus shown in FIGS. 3 and 4.

Turning now to FIG. 6, the preferred electrical circuit which comprises the timed control sequence for controlling the advancement of the carriage 22 upon the frame 20, the actuation of the cutter 32 and the movement of the conveyor 34 is shown schematically. A three-phase line 200 carrying current of a suitable voltage, e.g., 220 or 440 volts, and of 60 hertz frequency provides current for the hydraulic pump motor 102 and, by means of a single phase transformer 206, the counter 30, the conveyor drive motor 80, and the solenoids 106, 112, 116 and 118 causing initiation of the motor means 54 and 64. The line 200 is connected to the elements of the circuit through a disconnect switch 202 and a plurality of fuses 204 of suitable capacity. Hence, the entire circuit is preferably fused and controlled by the disconnect switch for safety. To provide a constant and usable voltage across the circuit, one phase of the three-phase line 200 is tapped and leads to the transformer 206, which steps down the voltage to 110 volts. The transformer 206 is capable of handling 750 volt-amperes and its primary windings are connected in parallel for a 220 volt line and in series for a 440 volt line. One lead from the secondary winding of the transformer 206 is connected to ground (as at 208) while the other lead is connected through a fuse 210 to a manually operated control power switch 212. The control power switch 212 operates the remainder of the circuit. A pilot light 213 is connected in parallel with the switch 212 to indicate when the control power switch is in its operative position.

When a starter switch 214 is manually closed, a contactor coil 216 closes starter contacts 218 in the line 200 which through suitable starter overloads 220 place the pump motor 102 in the circuit. It should be noted that the overloads 220 are variable such that the less the amount of overload on the pump motor 102, the greater the time the motor will continue to operate before the circuit is broken. These overloads 220 open the contactor coil 216 when an excessive overload is achieved. As the contactor coil 216 is energized, an auxiliary maintain contact 222 is closed, and the starter switch 214 can then be released and the motor will remain in the circuit. This auxiliary contact 222 is in parallel with the starter switch 214 and is connected through a manually operated stop switch 224 which can be utilized to quickly break the circuit, if necessary.

The counter 30 is in parallel with the pump motor contactor coil 216 and contains a single-pole, double-throw relay 226 therein. When it is desired that the carriage 22 be placed in automatic operation for advancing the cheese block 10, and retracting to receive another block, a switch 228 between the starter switch 214 and the counter 30 is closed so that the counter is placed in the circuit. The motor 80 for driving the conveyor 34 is in parallel with the counter 30 and the contactor coil 216 and is actuated concurrently by the starter switch 214.

Also in the circuit are the solenoids 106 and 112 for controlling the hydraulic motor means 54 which advances and retracts the carriage 22. When the cutter fork 62 is in its lowermost position and when the motor 102 has been actuated, a microswitch 230 in parallel with the counter 30 and the solenoids 106 and 112 is in its closed position. As the microswitch 230 is closed, a control relay 232 in series therewith is energized. This control relay 232 closes normally open switches 234, 236 and 238 and opens normally closed switch 240. A circuit is thereby completed to the solenoid 106 through the switches 258 and 236 so that the solenoid 106 can actuate the four-way valve 105 of the hydraulic system shown in FIG. 5. Subsequently, the piston 57 of the motor means 54 begins retracting within the cylinder 56 upon the flow of hydraulic fluid through the valve 105 and the carriage advances the cheese for the division thereof. Although the switch 234 is simultaneously closed, a switch 246 in the same line is normally open so that the solenoid 112 remains inoperative. This prevents the carriage from both advancing and retracting at the same time.

As the carriage advances bringing the block of cheese past the vertically disposed cutter 24, the counter 30 accumulates counts until it reaches the first of its preselected values. When this value is reached, a switch 250 in parallel with the counter is momentarily closed (for about 0.10 second) to initiate the timed control sequence and a timing relay 252 in series therewith is energized. The relay 252 lengthens the short output pulse and momentarily closes a switch 254 in parallel therewith which causes a control relay 256 in series therewith to be energized. The control relay 256 in turn opens normally closed switch 258 and closes normally open switches 260 and 262. As the switch 258 is opened, the circuit through switch 236 is broken and no further current is supplied to the solenoid 106 which operates the four-way valve 105 to control the flow of hydraulic fluid to the carriage motor means 54, thereby preventing further advancement of the carriage.

As the switch 260 is simultaneously closed by the control relay 256, a circuit is completed through the switches 260 and 238 (already closed by the relay 232) so as to place the solenoid 118 in the circuit. The solenoid 118 manipulates the four-way valve 114 which in turn allows hydraulic fluid to flow into the motor means 64. This causes the piston 67 to travel within the cylinder 66 and thereby cause the cutter fork 62 and the cutter 32 which are in their respective lowermost positions to rise, pass through the block of cheese and prepare a cut therefrom. Thus, shortly after the carriage 22 stops advancing, the cutter 32 moves so as to prepare a cut of cheese from the block. Although the switch 262 has also closed, nothing is accomplished as the switch 240 in series therewith is open. As the control relay 256 is energized for only a short period of time, when the timing relay 252 is deenergized, the control relay 256 is also deenergized, thereby reopening the switches 260 and 262. However, another control relay 268 is in parallel with the solenoid 118 and is energized at the same time. As the relay 268 is energized, it closes a normally open switch 270 in parallel with the switches 238 and 260 to continue current flow to the solenoid 118 and opens a normally closed switch 272 in series with the switch 262 to prevent current flow to the solenoid 116. The switch 270 remains closed despite the opening of the switch 260 when the timing sequence is over so that the cutter 32 continues in its upward path by means of the motor means 64 controlled by the solenoid 114.

As the cutter fork 62 commences rising to prepare the cheese cut, the microswitch 230 is no longer engaged and hence opens and a second microswitch 274 is engaged as the cutter fork 62 reaches its uppermost position. When the microswitch 230 opens, the control relay 232 is deenergized and the switches 234, 236 and 238 are again opened and the switch 240 is again closed. This prevents any further advancement of the carriage. However, as the microswitch 274 is engaged and closed, another control relay 276 in series therewith is placed in parallel with the pump motor contactor coil 216, the counter 30 and the solenoids 106 and 112. The control relay 276, when it is energized, closes the normally open switches 278, 280, and 282 and opens the normally closed switch 284. As the switch 280 is closed, current flows through switches 258 and 280 to the solenoid 106. This solenoid moves the valve 105 which provides fluid to the motor means 54 to again advance the carriage 22 and the block of cheese toward the cutters 24 and 32. However, the solenoid 112 which manipulates the valve 105 to cause retraction of the carriage remains inoperative as the switches 246 and 278 are open. As the switch 284 is open, no current flows to the solenoid 118 for manipulating the valve 114 which causes raising of the cutter fork 62 or to the control relay 268. Furthermore, the control relay 268 is deenergized, the switch 270 is again opened and the switch 272 is again closed.

The carriage continues to advance the block of cheese until the next programmed value in the counter 30 is accumulated. When this accumulated value has been counted, the switch 250 is again closed to trigger the timed control sequence. The timing relay 252 is energized which closes the switch 254 to again energize the control relay 256. As the relay 256 is energized, the normally closed switch 258 is opened so that no current is provided to the solenoid 106 and the carriage stops advancing.

Contemporaneously, the switch 262 is again closed so that a circuit is completed through the switches 262, 282, 272 and 240 to energize the solenoid 116 for operating the four-way valve 114. This allows hydraulic fluid to enter the motor means 64, which forces the cutter fork 62 downwardly, thereby preparing another cut of cheese 14.

In parallel with the solenoid 116 is a control relay 288 which is simultaneously energized. The control relay 288 opens a normally closed switch 290 and closes a normally open switch 292. The open switch 290 prevents current from flowing to the solenoid 118, which controls the motor means 64 to cause the cutter fork 62 to rise, so that the cutter will not attempt to rise and fall simultaneously. As the switch 292 is closed, the solenoid 116 remains in the circuit while the cutter 32 is falling even though the switch 262 is opened when the timing relay 252 is deenergized after only a short period of energization. Manually operated switches 294 and 296 are provided to override the automatic operation and to operate the cutter 32 in an upward or downward direction, respectively, if desired.

Thus, it can be seen that the carriage 22 automatically advances the block of cheese 10 until programmed values are accumulated by the counter 30, whereupon a timed sequence is initiated to cause the cutter to either rise or fall so as to prepare a cut of cheese from the block. After the cutter has provided the desired cut of cheese, the carriage again advances with the remainder of the block of cheese thereon.

When the carriage 22 is fully advanced so that the block of cheese has been completely formed into cuts of cheese, a microswitch 298 is actuated by the carriage. As this micro-switch 298 is actuated, a control relay 300 is energized. This relay 300 closes the normally open switch 246 so that the solenoid 112 is placed in the circuit through either switch 234 or 278, depending upon the last position of the cutter fork 62. When the solenoid 112 is energized, it causes the four-way valve 105 to allow hydraulic fluid to enter the motor means 54. The entering fluid forces the piston 57 and the piston rod 58 outwardly so that the carriage 22 retracts to its initial position. Another block of cheese can then be placed thereon in the cheese receiving area 38.

Simultaneously with the energization of the solenoid 112, the normally closed switch 302 is opened so that no current is provided to the solenoid 106 and the carriage is thereby prevented from advancing at the same time as it is retracting. Also, the normally closed switch 304 is opened so that the counter 30 is taken out of the circuit. Furthermore, the normally open switch 306 is closed by the relay 300 so as to maintain the relay 300 in the circuit as the carriage continues to retract and the microswitch 298 is disengaged.

When the carriage has fully retracted and a new block of cheese placed thereon, a cycle start switch 308 in series with the relay 300 is momentarily depressed. This deenergizes the relay 300 so that the switch 304 is again closed and the counter 30 is placed back in the circuit. The switch 302 is also again closed to allow the solenoid 106 to move the valve 105 so that the motor means 54 is provided with fluid to again advance the carriage 22. Thereafter, a new cycle is commenced.

Thus, the present invention provides an improved method and apparatus for preparing cuts from an homogeneous food product. Furthermore, the invention provides an apparatus for preparing cheese cuts of unequal size according to a predetermined distribution pattern, the cuts being formed rapidly and accurately. A series of unequal cuts can be prepared which when aggregated provide a given predetermined weight. The cuts of cheese prepared are arranged such that they can be conveniently packaged for retail distribution.

Although one form of the invention has been shown and described, it should be apparent that various modifications could be made therein without departing from the scope of the invention.

Various of the features of the invention are set forth in the following claims.

What is claimed is:

1. A method of preparing cuts from a homogeneous food product, comprising the steps of advancing the food product, sensing the advancement of the food product, generating a succession of signals during the sensing, accumulating the succession of generated signals until each of a plurality of separate preselected unequal values is reached, triggering a control sequence upon reaching each of said preselected values, stopping movement of the food product in response to each triggered control sequence, and dividing the food product into a cut in response to each triggered control sequence, whereby a plurality of cuts of unequal size are prepared.

2. A method according to claim 1 wherein the food product is an elongated cylindrical block of cheese, the block axially advancing to be divided into cuts of cheese.

3. A method according to claim 2 further comprising the step of dividing the block of cheese longitudinally into a pair of semi-cylindrical half-blocks as the block of cheese is advanced so that cuts of cheese of semi-circular shape are formed.

4. A method according to claim 2 further comprising the step of axially removing the cuts of cheese at a speed relatively greater than the advancement of the block so as to separate the cuts of cheese.

5. A method according to claim 1 wherein said plurality of cuts of unequal size when aggregated provide a given predetermined weight.

6. Apparatus for preparing cuts from a food product, comprising means for supporting and advancing said food product, sensing means for determining when said food product is advancing, means for producing a succession of signals as said sensing means determines that said food product is advancing, means for counting the succession of signals, said counting means being provided with a plurality of pre-selected unequal values, means for stopping movement of said advancing means each time one of said preselected values is reached, means for dividing said food product into a cut as each of said pre-selected values is reached by said counting means and the advancement of said food product is stopped, and means for a commencing movement of said food product after each cut is prepared, said advancing means comprising motor means actuated by said counting means and a carriage operatively associated with said motor means and adapted to advance along said support to move said food product into position for dividing, whereby a plurality of cuts of unequal size are prepared from said food product.

7. Apparatus for preparing cheese cuts from an elongated cylindrical block of cheese, comprising a support having a cheese receiving area for said block of cheese, carriage means for axially advancing said block upon said support, first means for dividing said block longitudinally into a pair of semi-cylindrical blocks as said block advances upon said support, sensing means operatively connected to said carriage means for determining when said block is advancing upon said support, pulse generating means for producing a succession of electrical signals as said sensing means determines when said block is advancing, means provided with predetermined unequal values for counting the generated succession of electrical signals until each of said predetermined accumulated count values is reached by said counting means, control means triggered by said counting means each time one of said accumulated count values is reached for stopping advancement of said carriage means, and second means for dividing said semi-cylindrical blocks transversely to their longitudinal dimensions into cuts of cheese of semicircular shape as the advancement of said semi-cylindrical blocks by said carriage means stops.

8. Apparatus according to claim 7 wherein said first and second dividing means comprise respectively first and second thin wires extending transversely to one another and defining a plane extending transversely to the longitudinal dimension of said block of cheese.

9. Apparatus according to claim 8 wherein said second dividing means further comprises motor means actuated by said control means for raising or lowering said second thin wire extending transversely to said block of cheese to divide said block into said cheese cuts.

* * * * *

UNITED STATES PATENT OFFICE
CERTIFICATE OF CORRECTION

Patent No. 3,776,073      Dated December 4, 1973

Inventor(s) Heinz Runge

It is certified that error appears in the above-identified patent and that said Letters Patent are hereby corrected as shown below:

Column 1, line 25, "chesse" should be --cheese--.

Column 8, line 12, "switches 258 and 236" should be --switches 228, 258 and 236--.

Signed and sealed this 25th day of June 1974.

(SEAL)
Attest:

EDWARD M. FLETCHER, JR.
Attesting Officer

C. MARSHALL DANN
Commissioner of Patents